United States Patent
Huang et al.

(10) Patent No.: US 12,548,629 B2
(45) Date of Patent: Feb. 10, 2026

(54) MEMORY CONTROLLER AND OPERATION METHOD THEREOF, AND MEMORY SYSTEM

(71) Applicant: Yangtze Memory Technologies Co., Ltd., Hubei (CN)

(72) Inventors: Zhen Huang, Hubei (CN); Kang Li, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 237 days.

(21) Appl. No.: 18/091,215

(22) Filed: Dec. 29, 2022

(65) Prior Publication Data

US 2024/0168648 A1 May 23, 2024

(30) Foreign Application Priority Data

Nov. 18, 2022 (CN) .......................... 202211449839.4

(51) Int. Cl.
*G11C 16/34* (2006.01)
*G06F 3/06* (2006.01)
*G06F 11/10* (2006.01)
*G11C 16/12* (2006.01)
*G06F 11/07* (2006.01)

(52) U.S. Cl.
CPC ........ *G11C 16/3418* (2013.01); *G06F 3/0634* (2013.01); *G06F 3/0653* (2013.01); *G06F 3/0679* (2013.01); *G11C 16/3404* (2013.01)

(58) Field of Classification Search
CPC .... G06F 3/0634; G06F 3/0653; G06F 3/0679; G11C 16/3404; G11C 16/3418
See application file for complete search history.

(56) References Cited

U.S. PATENT DOCUMENTS

| 9,847,141 B1 * | 12/2017 | Sagiv | G11C 29/44 |
| 10,573,390 B1 * | 2/2020 | Berman | G11C 16/08 |
| 11,238,943 B1 * | 2/2022 | Ray | G11C 16/0408 |

(Continued)

FOREIGN PATENT DOCUMENTS

CN 113010347 A * 6/2021 .......... G06F 11/1044

OTHER PUBLICATIONS

Translation of CN113010347A (Year: 2021).*

*Primary Examiner* — Khamdan N. Alrobaie
*Assistant Examiner* — Elizabeth Rose Agger
(74) *Attorney, Agent, or Firm* — Oblon, McClelland, Maier & Neustadt, L.L.P.

(57) ABSTRACT

Implementations of the present disclosure disclose a memory controller and an operation method thereof, and a memory system. The operation method of the memory controller can include a starting step of entering a high-order error correction mode when the data read from a memory block belongs to correctable error correction code data and an error bit count of the memory block is greater than a specific value, a detection step of checking whether an inducement type of the error bit count is charge leakage, and a remedying step of complementarily applying programming pulse signals to the memory block if the inducement type is the charge leakage. The present application reduces the refresh probability of the memory block, reduces the write amplification factor, and thus extends the service life of the memory device.

20 Claims, 7 Drawing Sheets

(56) References Cited

U.S. PATENT DOCUMENTS

| | | | | |
|---|---|---|---|---|
| 2013/0031443 | A1* | 1/2013 | Oh | G11C 16/0483 |
| | | | | 714/773 |
| 2016/0093403 | A1* | 3/2016 | Kim | G11C 17/16 |
| | | | | 365/96 |
| 2017/0132125 | A1* | 5/2017 | Cai | G06F 12/0261 |
| 2019/0189193 | A1* | 6/2019 | Kim | G11C 16/3418 |
| 2020/0192791 | A1* | 6/2020 | Yang | H04L 1/203 |
| 2023/0045990 | A1* | 2/2023 | He | G06F 3/0619 |
| 2024/0152279 | A1* | 5/2024 | Tseng | G11C 16/10 |
| 2024/0220355 | A1* | 7/2024 | Li | G06F 11/102 |
| 2024/0412568 | A1* | 12/2024 | Lee | G07C 5/0808 |

* cited by examiner

302

MEMORY CONTROLLER AND OPERATION METHOD THEREOF, AND MEMORY SYSTEM

INCORPORATION BY REFERENCE

This present application claims the benefit of Chinese Patent Application No. 202211449839.4, filed on Nov. 18, 2022, which is incorporated herein by reference in its entirety.

BACKGROUND

Technical Field

The present disclosure relates to the technical field of a semiconductor, in particular to a memory controller and an operation method thereof, and a memory system.

Description of the Related Art

Non-volatile memory devices have been widely used in electronic devices in various fields. Flash memory is one of the most widely used non-volatile memory devices that can be electrically erased and reprogrammed, and may include memory devices of both NOR and NAND architectures. In an operation on a flash memory, an erase operation may be performed at a block level, a programming operation may be performed at a memory page level, and a reading operation may be performed at a memory cell level. Programming of a multi-state flash memory is accomplished by identifying a plurality of different read reference voltage ranges. Due to the characteristic influence of NAND (the units of read, write and erase are not consistent, and the number of times of P/E is limited for each memory block), NAND is prone to data retention (DR) and read disturb (RD), thus resulting in data errors, therefore, it is necessary to add a flash translation layer (abbreviated to FTL) on the NAND to help to enhance the reliability of data through a RD & DR management mechanism in the FTL.

SUMMARY

The present disclosure provides a memory controller and an operation method thereof, and a memory system, which can solve the technical problems of an increased write amplification factor of a memory device and a shortened service life of the memory device.

The present disclosure provides an operation method of a memory controller that can include a starting step of entering a high-order error correction mode when the data read from a memory block belongs to correctable error correction code data and an error bit count of the memory block is greater than a specific value, a detection step of checking whether an inducement type of the error bit count is charge leakage, a remedying step of complementarily applying programming pulse signals to the memory block if the inducement type is the charge leakage.

In an implementation of the present application, prior to the starting step, the operation method can include performing a refresh operation on the memory block when the data stored in the memory block belongs to uncorrectable error correction code data.

In an implementation of the present application, the operation method further includes ending an error correction process of a memory block after directly performing error correction by a hard decoding module when the data read from the memory block belongs to correctable error correction code data and when an error bit count of the memory block is smaller than the specific value.

In an implementation of the present application, the memory device comprises at least one memory cell which provides at most $2^N$ states for storing N bits of data, the detection step including, on the premise that the read reference voltages of the remaining plurality of low-order states other than the last M high-order states of the $2^N$ states are kept unchanged, reducing the read reference voltages of the M high-order states, M and N being both positive integers, reading an error bit count of the memory block, and, if the error bit count of the memory block which is read in the detection step is smaller than the error bit count in the starting step, confirming that the inducement type is the charge leakage.

In an implementation of the present application, the operation method further including, if the error bit count of the memory block which is read in the detection step is greater than the error bit count in the starting step, performing a refresh operation on the memory block.

In an implementation of the present application, the remedying step of complementarily applying the programming pulse signals to the memory block includes complementarily applying a plurality of the programming pulse signals to the memory block in an incrementally stepped pulse manner during a programming operation.

In an implementation of the present application, the remedying step of complementarily applying the programming pulse signals to the memory block includes complementarily applying one of the programming pulse signals to the memory block in a one-time programming mode during the programming operation.

In an implementation of the present application, in the process of complementarily applying a plurality of programming pulse signals to the memory block in an incrementally stepped pulse manner, a check is performed after each application of one of the programming pulse signals.

In another aspect, the present application provides a memory controller for controlling a memory device, the memory controller being configured to perform a starting step of entering a high-order error correction mode when the data read from a memory block belongs to correctable error correction code data and an error bit count of the memory block is greater than a specific value, a detection step of checking whether an inducement type of the error bit count is charge leakage and a remedying step of complementarily applying programming pulse signals to the memory block if the inducement type is the charge leakage.

In an implementation of the present application, the memory controller is further configured to perform a refresh operation on the memory block when the data stored in the memory block belongs to uncorrectable error correction code data.

In an implementation of the present application, the memory controller is further configured to end an error correction process of a memory block after directly preforming error correction by a hard decoding module when the data read from the memory block belongs to correctable error correction code data and when an error bit count of the memory block is smaller than the specific value.

In an implementation of the present application, the memory device comprises at least one memory cell which provides at most 2N states for storing N bits of data, and the memory controller is further configured to; on the premise that the read reference voltages of the remaining plurality of low-order states other than the last M high-order states of the 2N states are kept unchanged, reduce the read reference voltages of the M high-order states; read an error bit count of the memory block; and if the error bit count of the memory block which is read in the detection step is smaller than the error bit count in the starting step, confirm that the inducement type is the charge leakage, wherein both M and N are positive integers.

In an implementation of the present application, the memory controller is further configured to, if the error bit count of the memory block which is read in the detection step is greater than the error bit count in the starting step, determine that the inducement type is read disturb or other factors and perform a refresh operation on the memory block.

In an implementation of the present application, the memory controller is further configured to complementarily apply a plurality of the programming pulse signals to the memory block in an incrementally stepped pulse manner during a programming operation.

In an implementation of the present application, the memory controller is further configured to complementarily apply one of the programming pulse signals to the memory block in a one-time programming mode during the programming operation.

In an implementation of the present application, the memory controller is further configured to, in the process of complementarily applying a plurality of programming pulse signals to the memory block in an incrementally stepped pulse manner, perform a check after each application of the programming pulse signal.

In another aspect, the present application provides a memory system comprising a memory device and the memory controller described above, the memory controller being used for controlling the memory device, wherein the memory controller is configured to perform a starting step of entering a high-order error correction mode when the data read from a memory block belongs to a correctable error correction code and an error bit count of the memory block is greater than a specific value, a detection step of checking whether an inducement type of the error bit count is charge leakage, and a remedying step of complementarily applying programming pulse signals to the memory block if the inducement type is the charge leakage.

Due to the adoption of the above technical solution, the present disclosure can provide significant advantages, such as, in the process of periodically sweeping the full disk during the power-on process of the present application, when the data read into the memory block belongs to HECC data, a process of judging whether the HECC is caused by charge leakage is added, and if it is, it is possible to supplement several programming pulse signals during programming, without rewriting the data of this memory block to another memory block, so as to avoid increasing WAF, and the service life of product can be increased.

BRIEF DESCRIPTION OF THE DRAWINGS

Various implementations of this disclosure that are proposed as examples will be described in detail with reference to the following figures, wherein like numerals reference like elements, and wherein.

DETAILED DESCRIPTION OF THE PREFERRED IMPLEMENTATIONS

Figure 1:
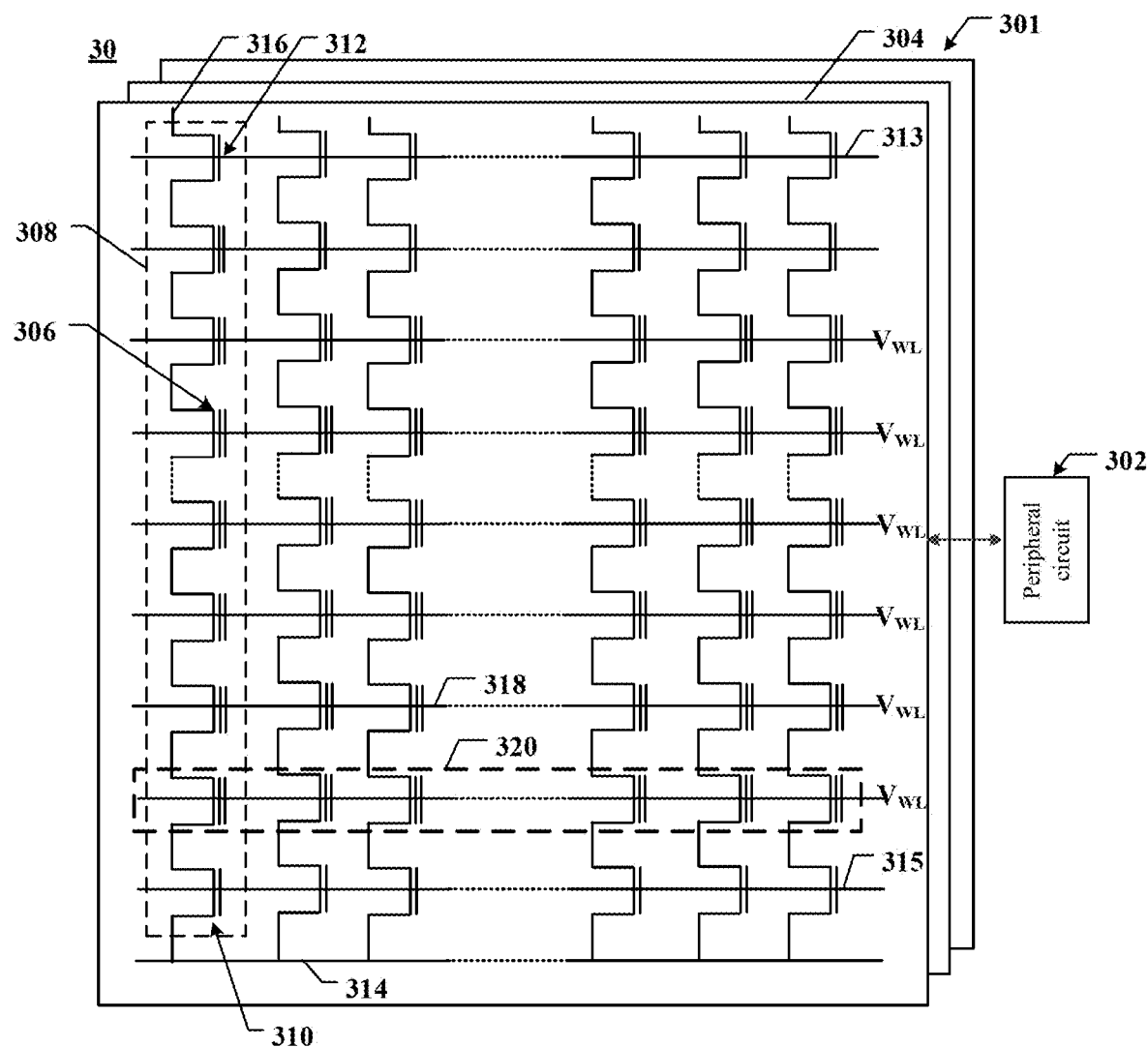
FIG. 1 illustrates a schematic diagram of a memory device according to some aspects of the present disclosure.

Hereinafter the technical solution in some implementations of the present disclosure will be described clearly and integrally in combination with the accompanying drawings, and obviously the described implementations are merely part of the implementations of the present disclosure, not all of the implementations. Based on the implementations provided by the present disclosure, all other implementations obtained by those skilled in the art belong to the scope of protection of the present disclosure.

In the description of the present disclosure, it should be understood that, the terms "center", "upper", "lower", "front", "rear", "left", "right", "vertical", "horizontal", "top", "bottom", "inner", "outer" and etc. indicate an orientation or position relationship based on the orientation or position relationship shown in the drawings, merely for the description of present disclosure and simplification of the description, but do not indicate or imply that the device or element referred to must have a particular orientation, be constructed and operated in a specific orientation, and therefore should not be construed as limiting the present disclosure.

Unless the context requires otherwise, throughout the specification and the claims, the term "comprising" is to be construed in an open, inclusive sense, that is as "including, but not limited to". In the description of the specification, the terms "one implementation", "some implementations", "exemplary implementations", "exemplarily" or "some examples" or the like are intended to indicate that particular features, structures, materials or characteristics related to this implementation or example are included in at least one implementation or example of the present application. The schematic representations of the above terms do not necessarily refer to the same implementation or example. Furthermore, the described particular features, structures, materials or characteristics may be included in any suitable manner in any one or more implementations or examples.

Hereinafter, the terms "first" and "second" are used for descriptive purpose only and are not to be construed as indicating or implying relative importance or implicitly indicating the number of the indicated technical features. Thus, a feature with "first" or "second" defined therein may explicitly or implicitly indicate that one or more such features are included. In description of the implementation of the present disclosure, "multiple" means two or more, unless otherwise indicated.

In describing some implementations, "coupled" and "connected" and their extensional expressions may be used. For example, the term "connected" may be used in describing some implementations to indicate that two or more components are in direct physical or electrical contact with each other. As another example, the term "coupled" may be used in describing some implementations to indicate that two or more components are in direct physical or electrical contact. However, the term "coupled" may also refer to that two or more components are not in direct contact with each other, but still cooperate or interact with each other. The implementations disclosed herein are not necessarily limited to the content of the present disclosure.

"At least one of A, B, and C" has the same meaning as "at least one of A, B or C" and includes the following combinations of A, B and C: A only, B only, C only, combination of A and B, combination of A and C, combination of B and C, and combination of A, B and C.

"A and/or B" includes the following three combinations: A only, B only, and a combination of A and B.

The use of "applicable to" or "configured to" herein means open and inclusive language, which does not exclude an apparatus that is applicable to or configured to perform additional tasks or steps.

In addition, the use of "based on" means being open and inclusive, in that the process, step, calculation, or other actions "based on" one or more of the conditions or values may in practice be based on additional conditions or beyond the values.

As used herein, "about", "substantially" or "approximate" indicates that the values set forth as well as an average value within an acceptable deviation range of a particular value, wherein the acceptable deviation range is as determined by those skilled in the art in view of the measurement in question and the error associated with the measurement of a particular amount, i.e., the limitations of the measurement system.

In the content of the present disclosure, the meanings of "on . . . ", "above . . . " and "over" should be construed in the broadest manner such that "on . . . " not only means "directly on something", but also includes the meaning of "on something" with intermediate features or layers therebetween, and "above" or "over" not only means being "above" or "over" something, but also includes the meaning of "on something" without intermediate features or layers therebetween (i.e., directly on something).

FIG. 1 shows a schematic circuit diagram of a memory 30 according to some aspects of the present disclosure. The memory 30 may be an example of the memory device 501 in FIG. 10. The memory 30 may include a memory device cell array 301 and a peripheral circuit 302 coupled to the memory device cell array 301. The memory device cell array 301 may be a NAND flash memory device cell array in which memory cells 306 are disposed in the form of an array of memory strings 308 of NAND memory devices, wherein the memory string 308 of each NAND memory device extends vertically above a substrate (not shown). In some implementations, the memory string 308 of each NAND memory device includes a plurality of memory cells 306 coupled in series and stacked vertically. Each memory cell 306 may maintain a continuous analog value, such as voltage or charge, which depends on the number of electrons captured within the area of the memory cell 306. Each memory cell 306 may be a floating gate type memory device cell including a floating gate transistor, or a charge trapping type memory device cell including a charge trapping transistor. It should be noted that for illustrative purposes, the NAND memory device of the present application is only one example of a memory apparatus. The memory 30 may include any suitable solid-state, non-volatile memory device, such as NOR flash memory, FeRAM, PCM, MRAM, STT-RAM or RRAM, or the like.

FIG. 1 shows a schematic diagram of a memory including a peripheral circuit. As shown in FIG. 1, the memory 30 may include a memory device cell array 301 and a peripheral circuit 302 coupled to the memory device cell array 301, wherein the memory device cell array 301 may be a NAND flash memory array, wherein memory cells 306 are provided in the form of an array of NAND memory strings 308, and each NAND memory string 308 extends vertically above a substrate (not shown). In some implementations, each NAND memory string 308 includes a plurality of memory cells 306 coupled in series and stacked vertically. Each memory cell 306 may maintain a continuous analog value, such as voltage or charge, which depends on the number of electrons captured within the memory area of the memory cell 306. Each memory cell 306 may be a floating gate type memory cell including a floating gate transistor, or a charge trapping type memory cell including a charge trapping transistor.

In some implementations, each memory cell 306 is a single level cell (abbreviated to SLC) that has two possible memory states and can thus store one bit of data. For example, the first memory state "0" may correspond to a first voltage range and the second memory state "1" may correspond to a second voltage range. In some implementations, each memory cell 306 is a multi level cell (abbreviated to MLC) that has multiple memory states and can thus store multiple bits of data. For example, the MLC may store two bits per cell, three bits per cell (also referred to as a trinary level cell (abbreviated to TLC)), or four bits per cell (also referred to as a quadruple level cell (abbreviated to QLC)). Each MLC may be programmed to take a range of possible nominal stored values. In one example, if each MLC store two bits of data, the MLC may be programmed to take one of three possible programming levels from the erased state by writing one of three possible nominal stored values to the memory cell. The fourth nominal stored value may be used for the erased state.

As shown in FIG. 1, each NAND memory string 308 may include a source select gate (SSG) 310 at a source terminal thereof and a drain select gate (DSG) 312 at a drain terminal thereof. SSG 310 and DSG 312 may be configured to activate the selected NAND memory strings 308 (columns of array) during reading and programming (or writing) operations. In some implementations, the sources of the NAND memory strings 308 in the same memory block 304 are coupled by the same source line (SL) 314 (e.g., common SL). In other words, according to some implementations, all NAND memory strings 308 in the same memory block 304 have an array common source (ACS). According to some implementations, the DSG 312 of each NAND memory string 308 is coupled to a corresponding bit line (BL) 316 from which data can be read and written via an output bus (not shown). In some implementations, each NAND memory string 308 is configured to be selected or deselected by applying a select voltage (e.g. above a threshold voltage of a transistor having a DSG 312) or a deselect voltage (e.g. 0 volts (V)) to the corresponding DSG 312 via one or more DSG lines 313 and/or by applying a select voltage (e.g. above a threshold voltage of a transistor having an SSG 310) or a deselect voltage (e.g. OV) to the corresponding SSG 310 via one or more SSG lines 315.

As shown in FIG. 1, the NAND memory string 308 may be organized as multiple memory blocks 304, each of which may have a common source line 314 (e.g., coupled to ground). In some implementations, each memory block 304 is a basic data unit with an erase operation, i.e., all memory cells 306 on the same memory block 304 are erased simultaneously. In order to erase the memory cells 306 in the selected memory block 304, the source line 314 of the unselected memory block 304 that is coupled to the selected memory block 304 and is in the same plane as the selected memory block 304 may be biased with an erase voltage (Vers). It should be appreciated that in some examples, the erase operation may be performed at a half-block level, at a quarter-block level, or at a level having any suitable number of blocks or any suitable fraction of blocks. The memory cells 306 of adjacent NAND memory strings 308 may be coupled by a word line 318 that selects which row of the memory cells 306 is subject to reading and programming operations. In some implementations, the memory cells 306 coupled to the same word line 318 are referred to as memory pages 320. The memory page 320 is a basic data unit for the programming operation or the reading operation, and size of a memory page 320 in the unit of bits may be related to the number of the NAND memory strings 308 coupled by the word lines 318 in one memory block 304. Each word line 318 may include a plurality of control gates (gate electrodes) at each memory cell 306 in the respective memory page 320 and gate lines coupling the control gates.

As shown in FIG. 1, the memory strings 308 of multiple NAND memory devices may be organized into multiple memory blocks 304. In some implementations, each memory block 304 is a basic data unit for the erase operation, i.e., all memory cells 306 on the same memory block 304 are erased simultaneously.

Figure 2:
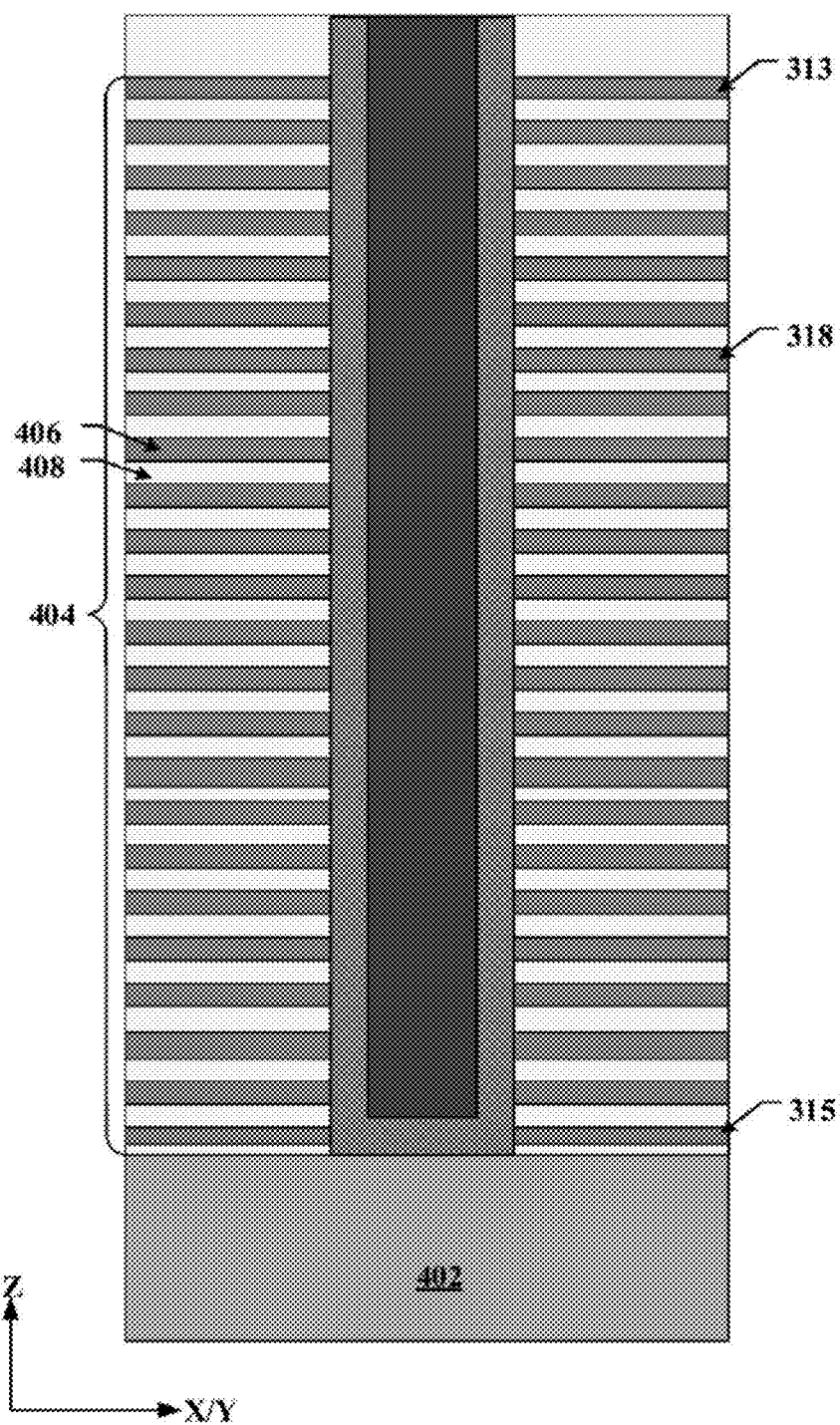
FIG. 2 illustrates a side view of a cross section of a cell array including a memory string of a NAND memory device according to some aspects of the present disclosure.

FIG. 2 illustrates a side view of a cross section of a memory string 308 of a memory device cell array 301 (not shown in FIG. 2) including a NAND memory device according to some aspects of the present disclosure. As shown in FIG. 2, the memory string 308 of the NAND memory device may extend vertically through a stack structure 404 over the substrate 402. The substrate 402 may include silicon (e.g. single crystal silicon), silicon germanium (SiGe), gallium arsenide (GaAs), germanium (Ge), silicon on insulator (abbreviated to SOI), germanium on insulator (abbreviated to GOI), or any other suitable material. The stack structure 404 may include alternating conductive layers 406 and dielectric layers 408. The number of the conductive layers 406 and the dielectric layers 408 in the stack structure 404 may determine the number of the memory cells 306 in the memory device cell array 301. The conductive layer 406 may include a conductive material including, but not limited to, tungsten (W), cobalt (Co), copper (Cu), aluminum (Al), polysilicon, doped silicon, silicide, or any combination thereof.

Figure 3:
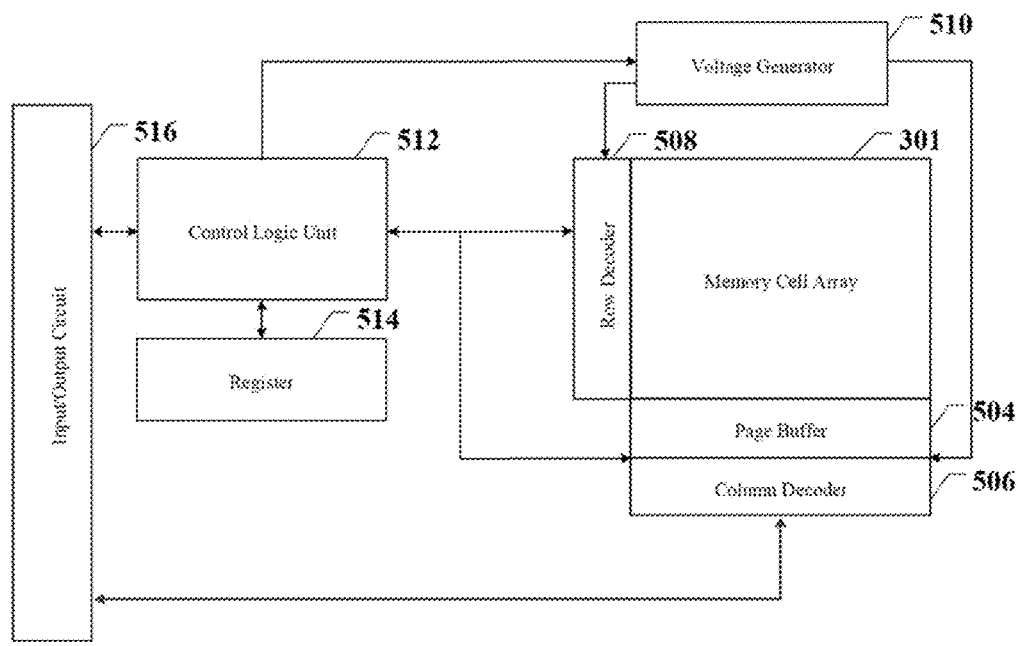
FIG. 3 illustrates a structural schematic diagram of a memory device according to some aspects of the present disclosure.

FIG. 3 shows some peripheral circuits 302. The peripheral circuit 302 includes a sensing amplifier 504, a column decoder 506, a row decoder 508, a voltage generator 510, a control logic unit 512, a register 514, and an input/output (I/O) circuit 516. It should be understood that in some examples, additional peripheral circuits not shown in FIG. 3 may further be included.

Figure 4:
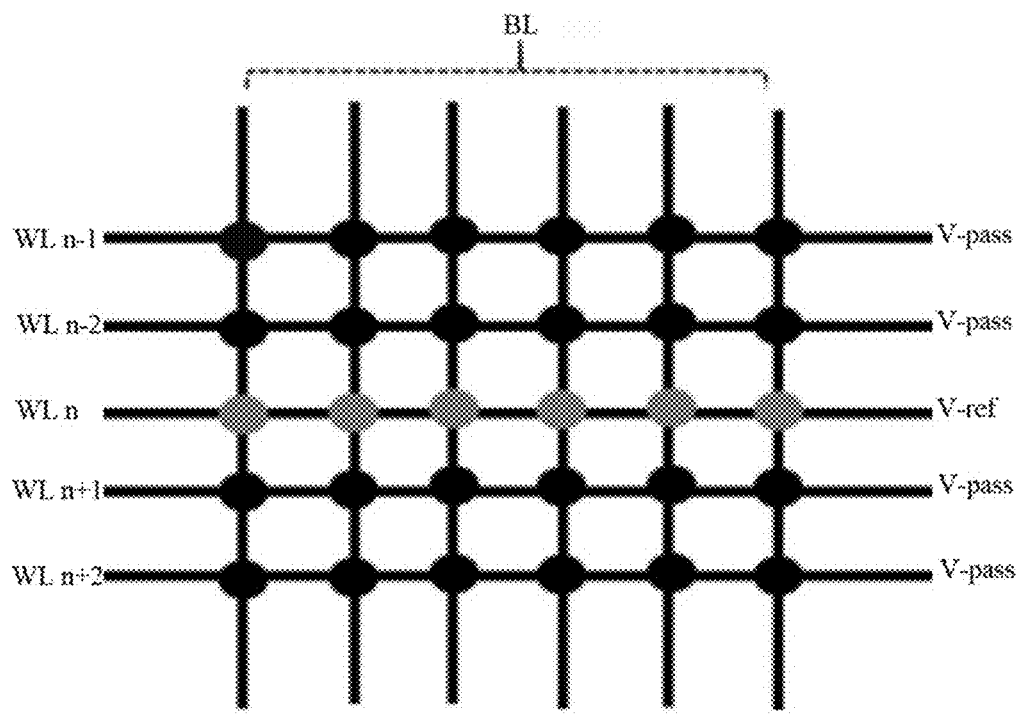
FIG. 4 is a schematic diagram of read disturb for a three-dimensional memory device according to an implementation of the present disclosure.

FIG. 4 is a schematic diagram of read disturb for a three-dimensional memory device according to an implementation of the present application. Read Disturb is an important failure mechanism of flash media, and managing the read disturb well is an important work of flash media-based storage products. Typical read disturb includes single page 320 read disturb and block level read disturb. To manage the read disturb problem, the memory device may record the read count of each physical block or super block of the flash memory. The read count refers to the number of times the reading operation is performed on a block (also referred to as a memory block), and includes both the number of times of the reading operation after the programming operation and the number of times of the reading operation alone. The physical block is a collection of memory pages 320 connected to the same source that can perform erase operations simultaneously. A plurality of physical blocks constitute one memory plane, and the super block is a memory block which is composed of a plurality of physical blocks on different memory planes and can perform reading and writing operations simultaneously. Once the read count reaches the read count threshold, the memory controller will scan all memory pages 320 of the entire block to check whether there is any risk, and the scanning here is a read operation at the default voltage. If there is a risk (error bits of some memory pages 320 reach a critical value), the memory controller will move the valid data of this physical block or super block into a new physical block or super block; if there is no risk, then wait for the next read count to reach the critical value. In some implementations, the number of error bits that occur is scanned according to the read reference voltage and then derived from an error correction code engine (i.e., an ECC circuit), but this does not really reflect the physical effect of the read disturb, but rather roughly reflects the case of some physical errors. These error conditions may be due to other factors such as data retention, cross temperature, and other reliability issues, and may even be due to an erroneous default read reference voltage. This will result in unnecessary data scanning and data moving operations, thus affecting the endurance of the entire system storage product.

Referring to FIG. 4, in the process of the reading operation performed by the current three-dimensional memory device (such as 3D NAND flash), one method is to apply a read voltage V-ref to a word line (gate) of the selected layer and a pass voltage V-pass to a gate of the unselected layer when reading data of a certain memory cell. In general, the pass voltage V-pass may reach more than 6V, and after tens of thousands of times of reading operation, the pass voltage V-pass may cause a significant increase in the read reference voltage, especially for the erase state (L0) and the low program state, thus resulting in a read error. This is the reading disturb/read disturb caused by the pass voltage. The experiment shows that the read disturb is positively correlated with the voltage causing the read disturb, and the larger the pass voltage V-pass is, the more serious the read disturb is. It should be noted that for illustrative purposes, the three-dimensional memory device (such as 3D NAND flash) of the present application is only one example of a memory apparatus. The memory device may also include a two-dimensional memory device (such as 2D NAND flash).

Figure 5:
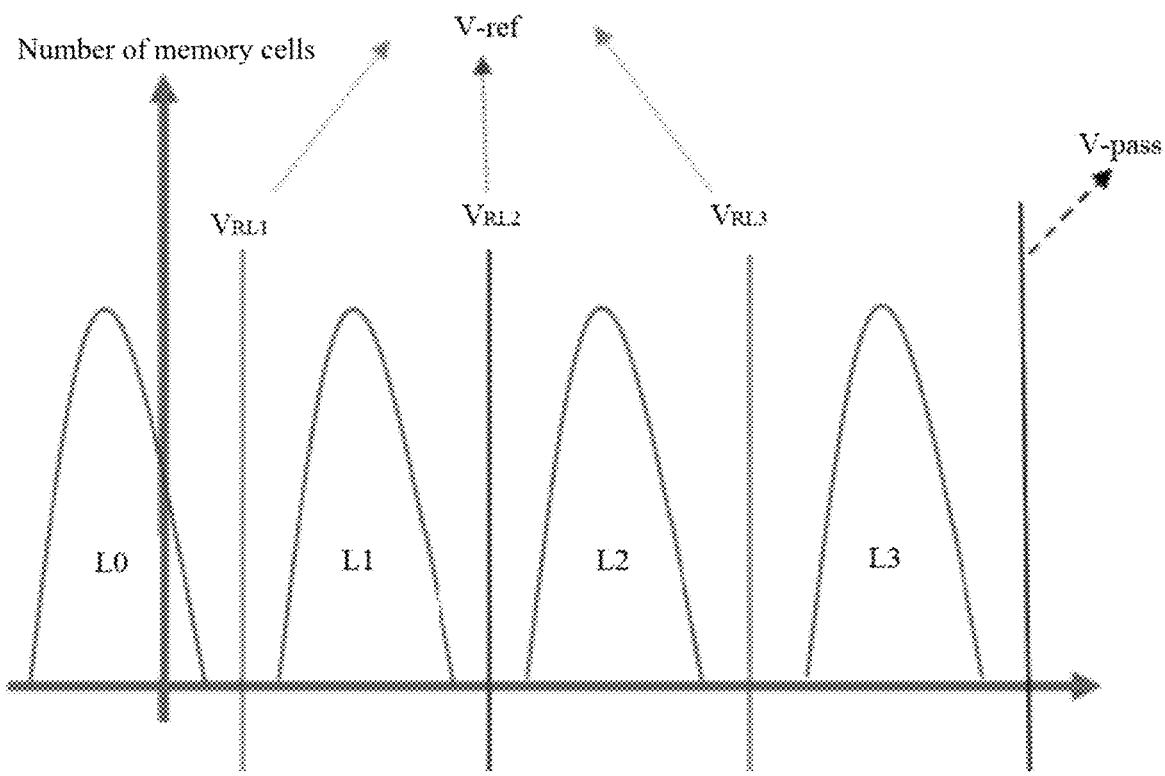
FIG. 5 is a schematic diagram of a reference voltage and a pass voltage of a three-dimensional memory device according to an implementation of the present disclosure.

FIG. 5 is a schematic diagram of a read voltage V-ref and a pass voltage V-pass of a three-dimensional memory device according to an implementation of the present application. As shown in FIG. 5, the MLC is taken as an example in which the memory cell includes four memory states (hereinafter simply referred to as states), the abscissa represents the threshold voltage distribution of the four different memory states, wherein L0 represents the threshold voltage distribution of the erase state, L1 to L3 represent the threshold voltage distribution of different programming states, and the ordinate represents the number of memory cells of each state, and it can be seen that the number of the memory cells of each state is in Gaussian distribution. The read voltage V-ref is between any two adjacent memory states, and the read reference voltages are VRL1, VRL2 and VRL3 in order from small to large, wherein VRL1 represents the default read reference voltage of the erase state, and the pass voltage V-pass is higher than the maximum value of the read reference voltage.

Figure 6:
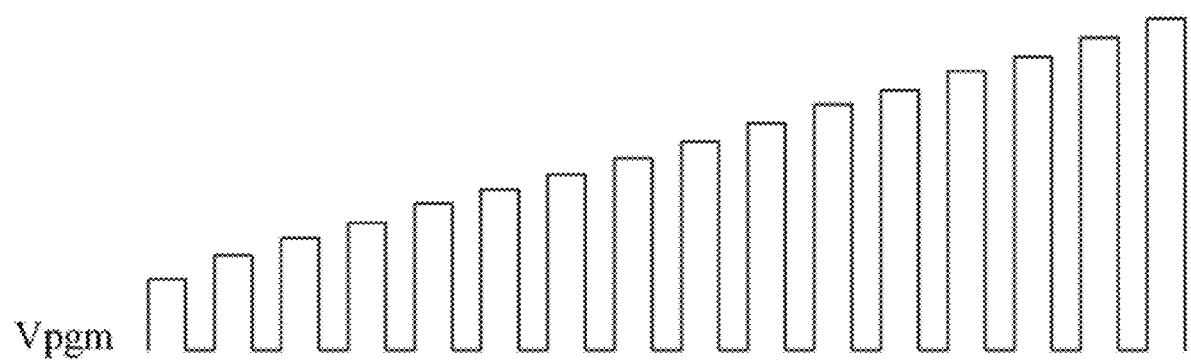
FIG. 6 is a structural schematic diagram of a stepped pulse in an ISPP mode provided in an implementation of the present disclosure.

In practical applications, for flash memory devices having multiple data states, such as NAND flash memory devices, in order to reduce coupling and disturb between the word lines when performing programming on the memory cells, in some implementations, multi-pass programming may be employed when programming a memory page 320 or block to achieve a tighter threshold voltage distribution. In some implementations, the multi-pass programming may include two-pass programming, three-pass programming, and etc., wherein the two-pass programming may include a first-pass coarse programming and a fine programming, and the three-pass programming may include a first-pass coarse programming, a second-pass coarse programming and a fine programming. Here, the last-pass programming in the multi-pass programming is a fine programming; the first-pass coarse programming and the second-pass coarse programming are collectively referred to as coarse programming and may also be referred to as non last-pass programming. In some implementations, either the non last-pass programming or the fine programming may be an incremental stepped pulse programming (ISPP) mode, and the ISPP scheme may be to program the memory cells in the selected memory page 320 several times while gradually increasing the word line bias voltage based on the stepped voltage, wherein the incremental stepped pulse Vpgm can be seen by referring to FIG. 6. In order to take into account both the programming speed and a wider read window margin, in some implementations, in the non last-pass programming (the individual coarse programming phases), a programming voltage pulse having a large set step size is applied on the selected word line (a word line that is selectively coupled with memory cells that need to be programmed), to quickly program the memory cells coupled to the selected word line to an intermediate data state. In a fine programming phase that follows each coarse programming phase, a programming voltage pulse having a small set step size is applied on the selected word line, to accurately program the memory cells coupled to the selected word line to the final data state. That is, in some implementations, in each-pass programming of the multi-pass programming, the programming voltage/pulse applied in the programming operation is increased in accordance with different set step sizes, and the specific step size can be set by the designer according to the actual programming conditions. The intermediate data state is one or more data states before the programmed memory cell reaches the final data state. For example, when programming a TLC type memory cell, before reaching the final data state, a certain memory can be programmed to at least one intermediate data state, and may also be programmed to other verifiable data states. The final data state is a data state to which the user desires the programmed memory cell to be programmed.

Figure 7:
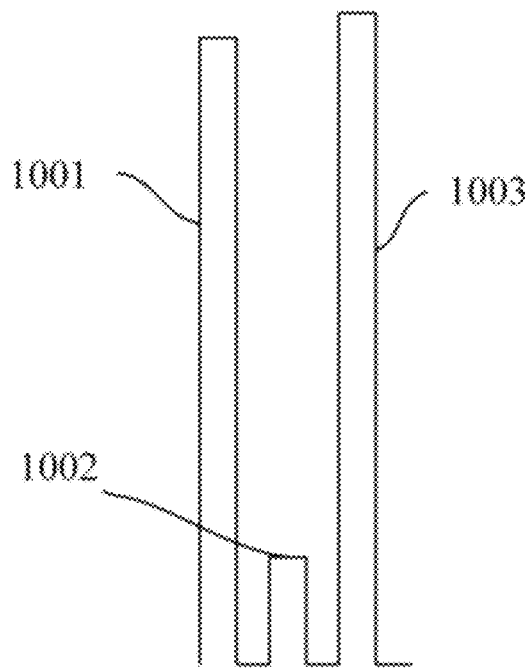
FIG. 7 is a schematic diagram of a verification voltage pulse provided in an implementation of the present disclosure.

It should be understood that during programming of the memory cell, in order to understand whether the programmed memory cell is programmed to a target programming data state, between the two times of application of the programming voltage pulse (the process of applying the programming voltage pulse is also referred to as a programming operation), a verification operation is added to determine whether the programmed memory cell is programmed to the target data state, that is, the programming operation and the verification operation are alternately performed. The verification operation may be one or a set of verification voltage pulses, and the verification voltage pulses are shown in FIG. 7, in which 1001 and 1003 denote stepping programming pulses Vpgm, and 1002 denotes a verification voltage pulse. Based on the foregoing description, that is, the multi-pass programming may include at least one pass of coarse programming and one pass of fine programming, and each pass of programming includes at least one programming operation and at least one verification operation.

When the NAND memory device is in a power-on state, the FTL periodically scans the written block, i.e., the memory block. The memory controller is designed to generate a refresh command according to a failed bit count (abbreviated to fbc) or a bit error rate of data read from the memory device. Specifically, the ECC circuit includes at least a decoder, an error counter, and a refresh control circuit. The decoder is configured to receive data and a corresponding parity check code from the memory device and to perform a decoding operation on the data using the corresponding parity check code to produce decoded data, wherein the data and the corresponding parity check may be read in response to a read command transmitted by the memory controller. In the process of decoding the data, the decoder can know which bit of the received data has an error, and once the error bit is found, the decoder notifies the error counter. The error counter is configured to generate error bit information to the refresh control circuit based on the error bit count found by the decoder, wherein the error bit information may be an error bit count over a period of time, or a bit error rate of data.

After the memory controller obtains the error bit count through the error counter, the control circuit compares the error bit count with a specific value. If the error counter is greater than the specific value, it indicates the occurrence of the HECC flag described below. The refresh control circuit directly performs a refresh operation on the memory block where the HECC occurs, and rewrites the data in the memory block where the HECC occurs to another new memory block, and directly rewrites the data, which increases a write amplification factor (abbreviated to WAF) of the memory controller and reduces the service life of the NAND memory device.

The refresh operation refers to an operation of rewriting or erasing a memory block, and the memory controller is composed of a plurality of memory cells 306 arranged in an array form in a row direction and a column direction in a memory device cell array 301. The memory controller may include a chip control circuit, a refresh control circuit, a decoder and an interface circuit, and an array control circuit connected with the memory device cell array 301. The decoder decodes an access request (data reading and writing) from a host 20 supplied via the interface circuit and outputs the decoded result to the array control circuit. The chip control circuit decodes the access request (data reading and writing) from the host 20 supplied via the interface circuit into a decoding result including row and column address information, and based on the refresh request from the refresh control circuit, supplies the decoding result and the control signal corresponding to the refresh request to the array control circuit. The array control circuit may perform a data read operation, a data write operation, and a refresh operation of the memory cells 306 in the memory device cell array 301. The refresh control circuit outputs a refresh operation request required to hold the data stored in the memory cell 306 according to a value of a timer included therein. A regular given interval (tREFI) completes the rewriting or erasing operation of the memory cells in the selected memory block by opening and closing the rows in an ordered manner. In addition, the chip control circuit performs arbitration (arbitration processing) between the access request (data reading and writing) and the refresh request. In this arbitration, a request generated earlier is preferentially processed.

Figure 8:
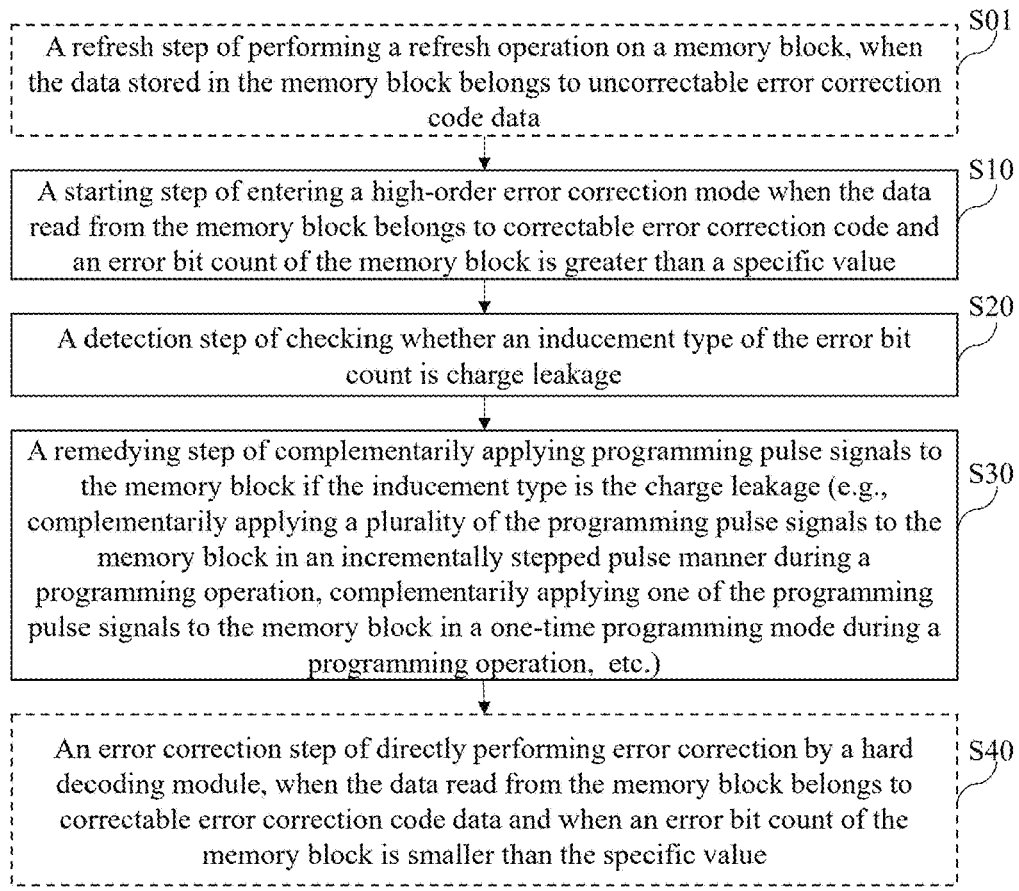
FIG. 8 is a flow schematic diagram of an operation method of a memory controller provided in an implementation of the present disclosure.

The present disclosure further provides a flow schematic diagram of an operation method of the memory controller of the implementation as shown in FIG. 8. The flow of the operation method of the memory controller includes a starting step S10 of entering a high-order error correction mode when the data read from a memory block belongs to correctable error correction code data and an error bit count of the memory block is greater than a specific value.

In some examples, the memory controller may perform various operations to ensure the reliability of data stored in the memory device. For example, the memory controller includes at least an error correcting code (abbreviated to ECC) circuit and a control circuit. The ECC circuit generates an error correction code for data stored in the memory device based on the error correction code, or detects an error in data read from the memory device for correction. Illustratively, the ECC circuit may detect and correct errors that are less than the error correction capability, and the ECC circuit may not detect or correct errors that exceed the error correction capability. The data that cannot be corrected by the ECC circuit belongs to an uncorrectable error correcting code (abbreviated to UECC). The data that can be corrected by the ECC circuit belongs to a correctable error correcting code (abbreviated to CECC). The data belonging to the correctable error correcting code is further classified as high error correcting code (abbreviated to HECC) data for which errors can be corrected by the ECC circuit and the error bit count of the memory block is greater than a certain value.

The ECC decoding operation may include a hard decoding operation and a soft decoding operation. The error correction mechanism of the ECC circuit is that a hard decoding module performs the hard decoding operation first, and then a soft decoding module performs the soft decoding operation, i.e., when the hard decoding operation fails, the soft decoding operation is performed. In summary, when the data is damaged to a high degree, the error in the data to be restored cannot be completely corrected by conventional read error correction alone. In this case, the memory controller may perform decoding error correction using a hard decoding function of the error correction code by adjusting to perform multiple repeated reading of the data to be restored by using different read threshold voltages. When the data is seriously damaged, data error correction may not be achieved by repeated reading and hard decoding several times. In this case, the memory controller may perform the soft decoding operation for data recovery. Both the hard decoding operation and the soft decoding operation may be iterated within a maximum iteration count until the ECC decoding operation is successful.

The specific value is an upper limit of the error count. If the error bit count of the memory block is greater than the specific value, it shows that the data bit error rate of the memory block is high. Although the data of the memory block still belongs to the CECC data, error correction by the ECC circuit takes a long time and it is difficult to perform error correction. The data belonging to CECC data and having an error bit count of a memory block greater than the specific value is regarded as HECC data, i.e., CECC data that needs to enter a high-order error correction mode. Therefore, in order to solve this problem, the present application directly enters the high-order error correction mode when the error bit count of the memory block is greater than the specific value.

For a specific flow of the high-order error correction mode, see the following steps S20 to S30.

A detection step S20: checking whether an inducement type of the error bit count is charge leakage.

In some examples, the data of the memory block may be susceptible to reading/read disturb, charge leakage, program disturb and erase disturb, resulting in errors. Thus, the inducement types include, but are not limited to, reading/read disturb, charge leakage, program disturb, write disturb, erase disturb. When the charge stored in the memory block is lost, i.e., the charge leaks, the data state of the memory block changes, such that the read data is erroneous. Therefore, in this step, the inducement type is detected and analyzed that the error bit count of the memory block is greater than the specific value.

Figure 9:
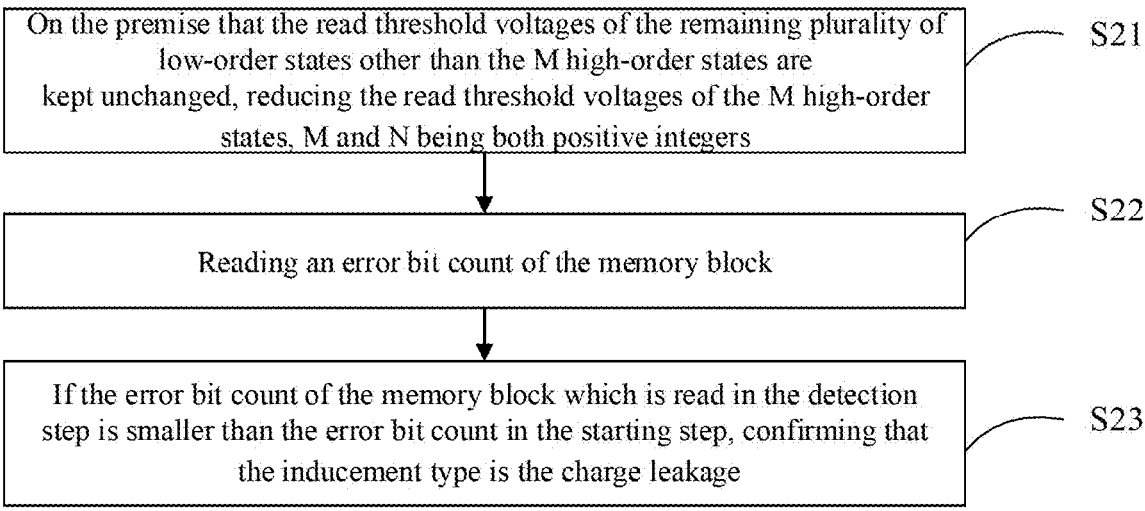
FIG. 9 is another flow schematic diagram of an operation method of a memory controller provided in an implementation of the present disclosure.

Specifically, continuing to refer to FIG. 9, the above detection step S20 may specifically include a step S21: on the premise that the read reference voltages of the remaining plurality of low-order states other than the M high-order states of the $2^N$ states are kept unchanged, reducing the read reference voltages of the M high-order states, M and N being both positive integers.

In some examples, since the memory device includes at least one memory cell 306, each memory cell 306 provides at most $2^N$ states for storing N bits of data. The memory cell 306 may be arranged as a single level memory cell or a multi-level memory cell, and the multi-level memory cell may be divided into a multi-level memory cell MLC, a trinary level memory cell TLC, and a quadruple level memory cell QLC, etc. Accordingly, for one memory page 320, at the end of a successful programming process (with verification), the read reference voltage of the programmed memory cell should be within one or more distributions. In the practical application process, different kinds of memory cells have different memory states, and the memory states include one erase state and a plurality of program states. Regardless of the type of memory cell, the erase state belongs to the low-order state. The plurality of program states are arranged in order of the read reference voltages from the smallest one to the largest one. The first $2^N-M-1$ program states can also be considered as low-order states, while the remaining plurality of program states arranged thereafter, i.e., M program states, are high-order states. Since the charge distribution concentration corresponding to the high-order state is higher than the charge distribution corresponding to the low-order state, the charge concentration of the high-order state decreases faster when the read reference voltage of the high-order state is reduced. In this way, on the premise that the read reference voltages of the $2^N-M-1$ low-order states are kept unchanged, the read voltages of the M high-order states are reduced, so that the threshold voltage distributions corresponding to the M high-order states can be deemed as shifted to the right as a whole.

The single level memory cell SLC stores one bit of data, and the single level memory cell SLC corresponds to two threshold voltage distributions, i.e., L0 and L1, wherein the threshold voltage distribution L0 corresponds to the erase state; the threshold voltage distribution L1 corresponds to the program state, and the read reference voltage that the threshold voltage distribution L0 corresponding to the erasing state has is smaller than the read reference voltage that the threshold voltage distribution L of the program state has. For example, L0 may be regarded as a low-order state and L1 may be regarded as a high-order state.

The multi-level memory cell MLC stores two bits of data, the multi-level memory cell MLC corresponds to four threshold voltage distributions: L0, L1, L2 and L3, and the read reference voltage rises in turn. Likewise, the threshold voltage distribution L0 corresponds to the erase state, and the threshold voltage distributions L1, L2 and L3 correspond to the program state. For example, L0 may be regarded as the low-order state, and L1, L2 and L3 may be regarded as the high-order state. Or, L0 and L1 may be regarded as the low-order state, and L2 and L3 may be regarded as the high-order state.

The trinary level memory cell TLC stores three bits of data, the trinary level memory cell TLC corresponds to eight threshold voltage distributions: L0, L1, L2, L3, L4, L5, L6 and L7, and the read reference voltage rises in turn. Likewise, the threshold voltage distribution L0 corresponds to the erase state, and the threshold voltage distributions L1, L2, L3, L4, L5, L6 and L7 correspond to the program state. For example, L0 may be regarded as the low-order state and L1 to L7 may be regarded as the high-order state. Or, L0 to L3 may be regarded as the low-order state, and L4 to L7 may be regarded as the high-order state.

A step S22: reading an error bit count of the memory block;
 a step S23: if the error bit count of the memory block which is read in the detection step is smaller than the error bit count in the starting step, confirming that the inducement type is the charge leakage.

In some examples, after keeping the read reference voltages of the $2^N-M-1$ low-order states unchanged and reducing the read reference voltages of the M high-order states as described in the step S21, the decoding operation is performed again by the decoder, and the error bit count is then updated by the error counter to obtain a new error bit count. The control circuit compares the error bit count obtained in the starting step S10 with the new error bit count obtained in the steps S21 to S22. If the error bit count obtained in the starting step S10 is smaller than the new error bit count obtained in the steps S21 to S22, i.e., the error bit count of the memory block decreases after reducing the read reference voltages of the M high-order states, then, the memory controller may confirm that the inducement type in which the error bit count of the memory block during the starting step S10 is greater than the specific value belongs to charge leakage, and the memory controller then complementarily applies a programming pulse signal to the memory block through the peripheral circuit in accordance with the remedying step S30.

A remedying step S30: complementarily applying a programming pulse signal to the memory block if the inducement type is the charge leakage.

In some examples, if it is analyzed that the inducement type that the error bit count of the memory block is greater than the specific value belongs to charge leakage, then the memory controller transmits instructions to the memory device through the control circuit, so as to control the peripheral circuit to complementarily apply a programming pulse signal to the memory block in the memory device which belongs to HECC and of which the inducement type of the error bit count belongs to charge leakage, and the lost charge of the memory block belonging to the HECC is compensated, this can reduce the refresh probability of the memory block, reduces the write amplification factor and thus extends the service life of the memory device. In addition, the delay effect caused by the refresh operation can be avoided, the delay of reading data of the whole system can be reduced, and the service quality can be improved.

In some implementations, the remedying step of complementarily applying the programming pulse signals to the memory block includes complementarily applying a plurality of the programming pulse signals to the memory block in an incrementally stepped pulse manner during a programming operation.

In some examples, in practical applications, for flash memory devices having multiple data states, such as NAND flash memory devices, in order to reduce coupling and disturb between the word lines when performing programming on the memory cells, in some implementations, multi-pass programming may be employed when programming a memory block to achieve a tighter threshold voltage distribution. The multi-pass programming may be an incremental stepped pulse programming (ISPP) mode, and the ISPP scheme may be to program the selected memory block several times while gradually increasing the word line bias voltage based on the stepped voltage, wherein the incremental stepped pulse Vpgm can be seen by referring to FIG. 6. In order to take into account both the programming speed and a wider read window margin (abbreviated to RWM), in the coarse programming stage of the non last-pass programming, a programming voltage pulse having a large set step size is applied to the memory block belonging to the HECC to rapidly program the memory block belonging to the HECC to an intermediate data state. A fine programming phase then proceeds after each non last-pass programming, in which a programming voltage pulse having a small set step size is applied to the memory block belonging to the HECC to accurately program the memory block belonging to the HECC to a final data state. That is, in each-pass programming of the multi-pass programming, the programming voltage/pulse signal applied in the programming operation is increased in accordance with different set step sizes, and the specific step size can be set by oneself according to the actual programming conditions.

In some implementations, in the process of complementarily applying a plurality of programming pulse signals to the memory block in an incrementally stepped pulse manner, a check is performed after each application of one of the programming pulse signals.

In some examples, the memory controller operate in an incremental stepped pulse programming (ISPP) scheme for the memory device to apply a programming voltage. The ISPP scheme is implemented by increasing the programming voltage in units of stepped voltage from a predetermined programming starting voltage. After the programming voltage is applied, a verification voltage is applied to the programmed memory block for programming verification.

For the programming operation, the incremental stepped pulse programming (ISPP) is performed. During the programming operation, the memory controller receives a program (or write) command and program address information.

The memory controller partially decodes the program address information into row and column address information. The memory controller may control the voltage generator 510 to generate voltage for programming data in the memory device cell array 301 and to provide row address information to the row decoder 508. The row decoder 508 selectively supplies word line voltage from the voltage generator 510 to the word line WL of the memory device cell array 301 in response to the row address information. In at least this example implementation, the row decoder 508 may select a memory block in response to a block address and select a memory page 320 therein. When the voltage is applied, the row decoder 508 applies a voltage high enough to enable pass of a string select transistor SST and applies a low voltage to the ground source transistor GST. The row decoder 508 supplies a non-selection voltage to the unselected memory cell transistor MCT so as to prevent these unselected memory cells MC from changing their threshold distribution state. The row decoder 508 further applies the programming voltage Vpgm to the word line WL of one or more selected memory cells. The programming voltage Vpgm starts with an initial voltage and incrementally increases at each programming cycle until the data is programmed, and it is indicated that verification passes after determining that the data has been programmed successfully, and then a next programming pulse signal is applied. For example, the programming voltage may vary from 15 V to 20 V. Similarly, the column decoder 506 may perform programming in an incremental stepped pulse programming (ISPP) scheme in the same way as the row decoder. In summary, cycles of several iterative processes are performed, and each cycle includes a program pulse application step for incrementing the threshold voltage and a verification reading step for determining whether the target threshold voltage has been reached.

In some implementations, the remedying step of complementarily applying the programming pulse signals to the memory block includes complementarily applying one of the programming pulse signals to the memory block in a one-time programming mode during the programming operation.

In some examples, a programming voltage pulse having a large voltage value is applied to the memory block during a program operation so as to apply one programming pulse signal at one time, such that the memory block belonging to the HECC is accurately programmed to the final data state.

Prior to the above-described starting step S10, the operation method may further include a refresh step S01: performing a refresh operation on the memory block when the data stored in the memory block belongs to uncorrectable error correction code data.

In some examples, for the data that cannot be corrected by the ECC circuit, i.e., the UECC data, the memory controller generates a refresh instruction according to a logical address corresponding to the memory block belonging to the UECC, and transmits the refresh instruction to the peripheral circuit connected to the memory device, and upon reception of the refresh instruction, the peripheral circuit performs a refresh operation on the memory block found by the logical address.

In some implementations, the operation method of the memory controller may further include an error correction step S40: ending an error correction process of a memory block after directly performing error correction by a hard decoding module when the data read from the memory block belongs to correctable error correction code data and when an error bit count of the memory block is smaller than the specific value.

In some examples, since the specific value is an upper limit of the error count, if the error bit count of the memory block is smaller than the specific value, it shows that the data bit error rate of the memory block is low. Although the data of the memory block still belongs to the CECC data, error correction by the ECC circuit takes a short time and it is easy to perform error correction. Therefore, there is no need to enter the high-order error correction mode, and a hard decoding module directly performs a hard decoding operation on the data read from the memory block so as to correct errors in the original read data using an error correction code hard decoding function to perform error correction, to read the data stored in the memory block correctly, and then end the error correction process for the memory block.

In the present application, when the data read from the memory block belongs to correctable error correction code data and the error bit count of the memory block is smaller than the specific value, the soft decoding operation can be omitted by performing correction directly by the error correction code hard decoding function, which can avoid the delay effect caused by the soft decoding operation, thereby effectively reducing the delay of reading data of the whole system and improving the service quality.

The above described detection step S20 may further include a step S24: if the error bit count of the memory block which is read in the detection step is greater than the error bit count in the starting step, determining that the inducement type is read disturb or other factors and perform a refresh operation on the memory block.

In some examples, wherein other factors include program disturb, write disturb, erase disturb, and etc. After keeping the read reference voltages of the $2^N-M-1$ low-order states unchanged and reducing the read reference voltages of the M high-order states as described in the step S21, the decoding operation is performed again by the decoder, and the error bit count is then updated by the error counter to obtain a new error bit count. The control circuit compares the error bit count obtained in the starting step S10 with the new error bit count obtained in the steps S21 to S22. If the error bit count obtained in the starting step S10 is greater than the new error bit count obtained in the steps S21 to S22, then, the memory controller may confirm that the inducement type in which the error bit count of the memory block during the starting step S10 is greater than the specific value does not belong to charge leakage, but rather read disturb or other factors, in this way, the memory controller needs to perform a refresh operation on the memory block by the refresh control circuit with reference to the remedying step S30.

Based on the same inventive concept, the implementation of the present application further provides a memory controller for controlling a memory device, the memory controller being configured to perform a starting step of entering a high-order error correction mode when the data read from a memory block belongs to correctable error correction code data and an error bit count of the memory block is greater than a specific value, a detection step of checking whether an inducement type of the error bit count is charge leakage, and a remedying step of complementarily applying programming pulse signals to the memory block if the inducement type is the charge leakage.

In some examples, the memory controller is further configured to perform a refresh operation on the memory block when the data stored in the memory block belongs to uncorrectable error correction code data.

In some examples, the memory controller is further configured to end an error correction process of a memory block after directly performing error correction by a hard decoding module when the data read from the memory block belongs to correctable error correction code data and when an error bit count of the memory block is smaller than the specific value.

In some examples, the memory device comprises at least one memory cell which provides at most $2^N$ states for storing N bits of data, the memory controller is further configured to, on the premise that the read reference voltages of the remaining plurality of low-order states other than the last M high-order states of the $2^N$ states are kept unchanged, reduce the read reference voltages of the M high-order states; M and N being both positive integers, reading an error bit count of the memory block and, if the error bit count of the memory block which is read in the detection step is smaller than the error bit count in the starting step, confirming that the inducement type is the charge leakage.

In some examples, the memory controller is further configured to, if the error bit count of the memory block which is read in the detection step is greater than the error bit count in the starting step, determine that the inducement type is read disturb or other factors and perform a refresh operation on the memory block.

In some examples, the memory controller is further configured to complementarily apply a plurality of the programming pulse signals to the memory block in an incrementally stepped pulse manner during a programming operation.

In some examples, the memory controller is further configured to complementarily apply one of the programming pulse signals to the memory block in a one-time programming mode during the programming operation.

In some examples, the memory controller is further configured to in the process of complementarily applying a plurality of programming pulse signals to the memory block in an incrementally stepped pulse manner, perform a check after each application of the programming pulse signal.

It should be noted that the technical solution described in the operation method and the technical solution of the above-mentioned memory device belong to the same inventive concept, and both of them have the same technical feature. The structure of the memory device and the nouns appearing in the technical solution of the present application have been described in detail in the foregoing, so that the nouns appearing here can be understood according to the meanings of the foregoing description, and will not be repeated here.

The implementation of the present application further provides a memory system comprising a memory device, and the memory controller described above, the memory controller being used for controlling the memory device, wherein the memory controller is configured to perform a starting step of entering a high-order error correction mode when the data read from a memory block belongs to a correctable error correction code and an error bit count of the memory block is greater than a specific value, a detection step of checking whether an inducement type of the error bit count is charge leakage, and a remedying step of complementarily applying programming pulse signals to the memory block if the inducement type is the charge leakage.

It should be noted that the memory system herein includes the aforementioned memory controller, and both have the same technical feature. The structures of the memory device and the memory controller, and the nouns appearing in the technical solution of the present application have been described in detail in the foregoing, so that the nouns appearing here can be understood according to the meanings of the foregoing description, and will not be repeated here.

The memory system may be integrated into various types of memory equipment, for example, included in the same package (such as a Universal Flash Storage (abbreviated to UFS) package or an Embedded Multi Media Card (abbreviated to eMMC) package). That is, the memory system may be applied to and packaged into different types of electronic products, such as a mobile phone (e.g., a cell phone), a desktop computer, a tablet, a notebook computer, a server, a vehicle-mounted apparatus, a game console, a printer, a positioning apparatus, a wearable apparatus, a smart sensor, a mobile power supply, a virtual reality (abbreviated to VR) apparatus, an augmented reality (abbreviated to AR) apparatus, or any other suitable electronic apparatus having a memory therein.

Figure 10:
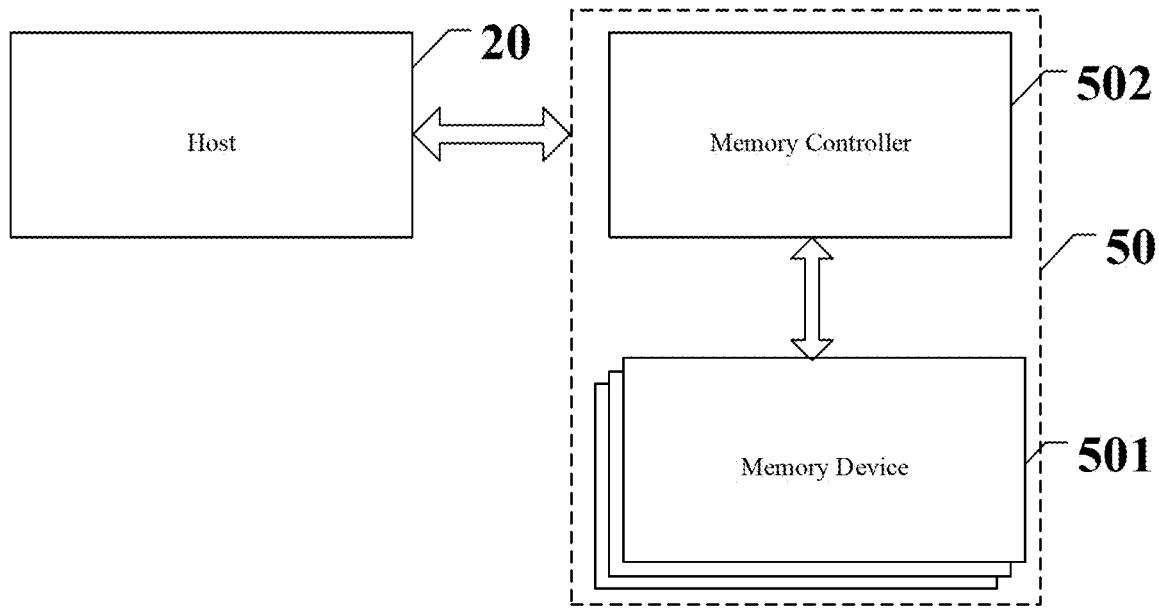
FIG. 10 is a structural schematic diagram of a memory system provided in an implementation of the present disclosure.
Figure 11:
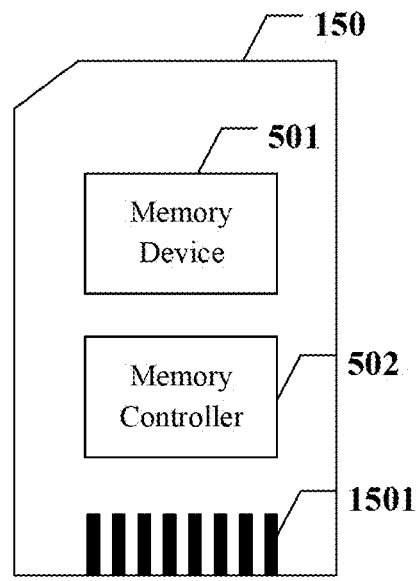
FIG. 11 is a schematic diagram of a memory device card having a memory system according to some aspects provided by the present disclosure.

In some examples, as shown in FIG. 10, the memory system 50 includes a memory controller and a three-dimensional memory device, and the memory system may be integrated into a three-dimensional memory device card 150 as shown in FIG. 11.

The three-dimensional memory device card 150 includes any one of a PC card (PCMCIA, Personal Computer Three-dimensional Memory Device Card International Association), a compact flash (abbreviated to CF) card, a smart media (abbreviated to SM) card, a three-dimensional memory device stick, a multimedia card (abbreviated to MMC), a secure digital memory (abbreviated to SD) card, and a UFS.

In some other implementations, the memory system 50 includes a memory controller and a plurality of three-dimensional memory devices, and the memory system 50 is integrated into solid state drives (abbreviated to SSD).

Some implementations of the present application further provide an electronic apparatus. The electronic apparatus may be any one of a mobile phone, a desktop computer, a tablet computer, a notebook computer, a server, an vehicle-mounted apparatus, a wearable apparatus (such as a smart watch, a smart bracelet, smart glasses, and etc.), a mobile power supply, a gaming machine, a digital multimedia player, and the like.

As shown in FIG. 10, the electronic apparatus 1000 may include the memory system 50 described above, and may further include at least one of a central processing unit (abbreviated to CPU), a cache, and the like. The electronic apparatus may be a mobile phone, a desktop computer, a laptop computer, a tablet computer, a vehicle computer, a game console, a printer, a positioning apparatus, a wearable electronic apparatus, a smart sensor, a virtual reality (abbreviated to VR) apparatus, an augmented reality (abbreviated to AR) apparatus, or any other suitable electronic apparatus having a memory therein. The electronic apparatus 1000 may include a host 20 and a memory system 50 having one or more memory devices 501 and a memory controller 502. The host 20 may include a processor of an electronic apparatus, such as a central processing unit (abbreviated to CPU), or a system-on-chip (abbreviated to SoC), such as an application processor (abbreviated to AP). The host 20 may further include a memory interface for coupling with the memory system 50, and the memory interface is configured to comply with a corresponding protocol (e.g., NVMe, PCIe, etc.). The host 20 may be configured to transmit data to or receive data from the memory device 501 through, for example, the memory interface. In order to transmit data to or receive data from the memory device 501, the host 20 may send instructions to the memory system 50 in addition to the data. The memory device 501 may be any of the memory devices disclosed in this application.

According to some implementations, the memory controller 502 is coupled to the memory device 501 and the host 20, and is configured to control the memory device 501. The memory controller 502 may be implemented specifically by a micro processor, a micro memory controller (also known as a micro memory controller unit (MCU)), a central processing unit (CPU), a digital signal processor (DSP), an application specific integrated circuit (ASIC), a field programmable gate array (FPGA), a programmable logic device (PLD), a state machine, a gated logic unit, a discrete hardware circuit or combination thereof, as well as other suitable hardware, firmware, and/or software configured to perform the various functions described in detail below. The memory controller 502 may manage data stored in the memory device 501 and communicate with the host 20 through its front-segment interface. In some implementations, the memory controller 502 is designed to operate in a low duty cycle environment, such as a secure digital (abbreviated to SD) card, a compact flash (abbreviated to CF) card, an universal serial bus (abbreviated to USB) flash drive, or other media for use in electronic apparatuses such as a personal computer, a digital camera, a mobile phone, and the like. In some implementations, the memory controller 502 is designed to operate in a high duty cycle environment SSD or an embedded multi-media-card (abbreviated to eMMC). SSD or eMMC are used as data storage and enterprise storage arrays for mobile devices such as smart phones, tablet computers, laptop computers, etc. The memory controller 502 may be configured to control operations of the memory device 501, such as reading, erasing, and programming operations.

The memory controller 502 may also be configured to manage various functions regarding data stored or to be stored in the memory device 501, including but not limited to bad block management, garbage collection, logical-to-physical address translation, wear leveling, and etc. In some implementations, the memory controller 502 is also configured to process an error correction code (abbreviated to ECC) of the data read from or written to the memory device 501. The memory controller 502 may also perform any other suitable function, such as formatting the memory device 501. The memory controller 502 may communicate with an external apparatus (e.g., the host 20) according to a specific communication protocol. For example, the memory controller 502 may communicate with an external apparatus through at least one of various interface protocols, which may be, for example, a universal serial bus (abbreviated to USB) protocol, a multimedia card (abbreviated to MMC) protocol, a peripheral component interconnection (abbreviated to PCI) protocol, a PCI-express (abbreviated to PCI-E) protocol, an advanced technology attachment (abbreviated to ATA) protocol, a serial ATA protocol, a parallel ATA protocol, a small computer small interface (abbreviated to SCSI) protocol, an enhanced small disk interface (abbreviated to ESDI) protocol, an integrated drive electronics (abbreviated to IDE) protocol, a Firewire protocol, and etc.

Figure 12:
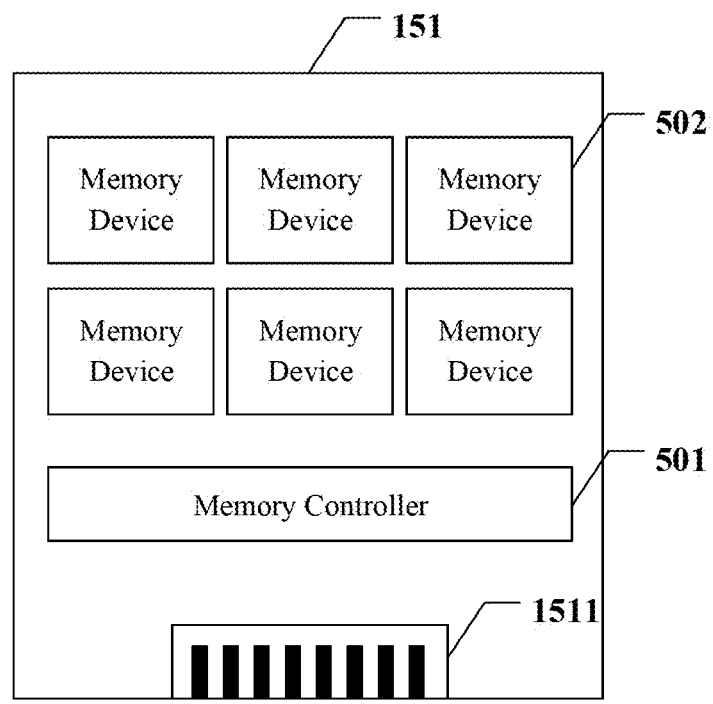
FIG. 12 is a schematic diagram of a solid state drive (SSD) having a memory system according to some aspects of the present disclosure.

The memory controller 502 and one or more memory devices 501 may be integrated into various types of memory systems, for example, included in the same package (e.g., a universal Flash storage (abbreviated to UFS) package or an eMMC package). That is, the memory system 50 may be implemented and packaged into different types of terminal electronic products. In one example as shown in FIG. 11, the memory controller 502 and a single memory device 501 may be integrated into the three-dimensional memory device card 150. The three-dimensional memory device card 150 may include a PC card (personal computer memory card international association (abbreviated to PCMCIA)), a CF card, a smart media (abbreviated to SM) card, a memory device stick, a multimedia card (MMC, RS-MMC, MMC micro), an SD card (SD, mini SD, micro SD, SDHC), a UFS, and etc. The three-dimensional memory device card 150 may also include a memory device card connector 1501 which is configured to couple the three-dimensional memory device card 150 to the host 20. In another example as shown in FIG. 12, the memory controller 502 and a plurality of memory devices 501 may be integrated into the SSD 151. The SSD 151 may also include an SSD connector 1511 which is configured to couple the SSD 151 to the host 20. In some implementations, the storage capacity and/or operation speed of the SSD 151 is higher than the storage capacity and/or operation speed of the three-dimensional memory device card 150.

A memory controller and an operation method thereof, and a memory system provided by implementations of the present disclosure are described in detail above. Specific examples are used herein to illustrate the principles and implementations of the present disclosure. The above implementations are described merely for helping to understand the method and core concept of the present disclosure; in addition, a person skilled in the art can, on the basis of the concept of the present disclosure, make modifications to both of the specific implementations and application scope. In conclusion, the exemplary implementations disclosed herein should not be understood as limitation to the present disclosure.

The invention claimed is:

1. A method of operating a memory controller for controlling a memory, the memory comprising a memory block, the method comprising:
   during a starting scan of the memory,
      identifying data read from the memory block as Correctable Error Correcting Code (CECC) data or Uncorrectable Error Correcting Code (UECC) data, by determining whether errors in the data exceed an error correction capability of the memory controller,
      upon the data being identified as CECC data, determining whether an error bit count of the memory block is greater than a specific value, and
      entering a high-order error correction mode when the error bit count of the memory block is greater than the specific value,
   wherein the high-order error correction mode comprises:
      a detection step of checking whether an inducement type of the error bit count is charge leakage by comparing the error bit count in the starting scan and a second error bit count in the detection step, and
      a remedying step of complementarily applying programming pulse signals to the memory block if the inducement type is the charge leakage.

2. The method of claim 1, further comprising:
   upon the data being identified as UECC data, performing a refresh process on the memory block.

3. The method of claim 1, further comprising, upon the data being identified as CECC data, when the error bit count of the memory block is smaller than the specific value:
   directly performing error correction by a hard decoding module, and
   after the error correction by the hard decoding module, ending an error correction process of the memory block.

4. The method of claim 1, wherein the memory block includes at least one memory cell which provides at most 2N states for storing N bits of data, the detection step comprising:

on the premise that read reference voltages of the remaining plurality of low-order states other than the last M high-order states of the $2^N$ states are kept unchanged, reducing the read reference voltages of the M high-order states, M and N being both positive integers;

reading an error bit count of the memory block, as the second error bit count in the detection step; and if the error bit count of the memory block which is read in the detection step is smaller than the error bit count in the starting scan, confirming that the inducement type is the charge leakage.

5. The method of claim 1, further comprising:

if the error bit count of the memory block which is read in the detection step is greater than the error bit count in the starting scan, determining that the inducement type is read disturb, erase disturb, program disturb, or write disturb, and performing a refresh process on the memory block.

6. The method of claim 1, wherein the remedying step of complementarily applying the programming pulse signals to the memory block includes:

complementarily applying a plurality of the programming pulse signals to the memory block in an incrementally stepped pulse manner during a programming operation.

7. The method of claim 6, wherein, in the process of complementarily applying a plurality of the programming pulse signals to the memory block in the incrementally stepped pulse manner, a check is performed after each application of one of the programming pulse signals.

8. The method of claim 1, wherein the remedying step of complementarily applying the programming pulse signals to the memory block includes:

complementarily applying one of the programming pulse signals to the memory block in a one-time programming mode during a programming operation.

9. A memory controller for controlling a memory that comprises a memory block, wherein the memory controller is configured to perform:

during a starting scan of the memory,
identifying data read from the memory block as Correctable Error Correcting Code (CECC) data or Uncorrectable Error Correcting Code (UECC) data, by determining whether errors in the data exceed an error correction capability of the memory controller,
upon the data being identified as CECC data, determining whether an error bit count of the memory block is greater than a specific value, and
entering a high-order error correction mode when the error bit count of the memory block is greater than a specific value, and wherein the high-order error correction mode comprises:

a detection step of checking whether an inducement type of the error bit count is charge leakage by comparing the error bit count in the starting scan and a second error bit count in the detection step, and a remedying step of complementarily applying programming pulse signals to the memory block if the inducement type is the charge leakage.

10. The memory controller of claim 9, wherein the memory controller is further configured to:

upon the data being identified as UECC data, perform a refresh process on the memory block.

11. The memory controller of claim 9, wherein the memory controller is further configured to, upon the data being identified as CECC data, when the error bit count of the memory block is smaller than the specific value:

directly perform error correction by a hard decoding module, and after the error correction by the hard decoding module, end an error correction process of the memory block.

12. The memory controller of claim 9, wherein the memory block includes at least one memory cell which provides at most $2^N$ states for storing N bits of data, the memory controller is further configured to:

on premise that read reference voltages of the remaining plurality of low-order states other than the last M high-order states of the $2^N$ states are kept unchanged, reduce the read reference voltages of the M high-order states, M and N being both positive integers;

read an error bit count of the memory block, as the second error bit count in the detection step; and if the error bit count of the memory block which is read in the detection step is smaller than the error bit count in the starting scan, confirm that the inducement type is the charge leakage.

13. The memory controller of claim 12, wherein the memory controller is further configured to:

if the error bit count of the memory block which is read in the detection step is greater than the error bit count in the starting scan, determine that the inducement type is read disturb, erase disturb, program disturb, or write disturb, and perform a refresh process on the memory block.

14. The memory controller of claim 9, wherein the memory controller is further configured to:

complementarily apply a plurality of the programming pulse signals to the memory block in an incrementally stepped pulse manner during a programming operation.

15. The memory controller of claim 14, wherein the memory controller is further configured to:

in the process of complementarily applying a plurality of the programming pulse signals to the memory block in the incrementally stepped pulse manner, perform a check after each application of one of the programming pulse signals.

16. The memory controller of claim 9, wherein the memory controller is further configured to:

complementarily apply one of the programming pulse signals to the memory block in a one-time programming mode during a programming operation.

17. A memory system having a memory controller for controlling a memory, the memory comprising a memory block, wherein the memory controller is configured to perform:

during a starting scan of the memory,
identifying data read from the memory block as Correctable Error Correcting Code (CECC) data or Uncorrectable Error Correcting Code (UECC) data, by determining whether errors in the data exceed an error correction capability of the memory controller,
upon the data being identified as CECC data, determining whether an error bit count of the memory block is greater than a specific value, and
entering a high-order error correction mode when the error bit count of the memory block is greater than a specific value;

and wherein the high-order error correction mode comprises:

a detection step of checking whether an inducement type of the error bit count is charge leakage by comparing the error bit count in the starting scan and a second error bit count in the detection step, and a remedying step of complementarily applying programming pulse signals to the memory block if the inducement type is the charge leakage.

18. The memory system of claim 17, wherein the memory controller is further configured to:

upon the data being identified as UECC data, perform a refresh process on the memory block.

19. The memory system of claim 17, wherein the memory controller is further configured to, upon the data being identified as CECC data, when the error bit count of the memory block is smaller than the specific value:

directly perform error correction by a hard decoding module, and after the error correction by the hard decoding module, end an error correction process of the memory block.

20. The memory system of claim 17, wherein the memory block includes at least one memory cell which provides at most $2^N$ states for storing N bits of data, the memory controller is further configured to:

on the premise that read reference voltages of the remaining plurality of low-order states other than the last M high-order states of the $2^N$ states are kept unchanged, reduce the read reference voltages of the M high-order states, M and N being both positive integers;

read an error bit count of the memory block, as the second error bit count in the detection step; and if the error bit count of the memory block which is read in the detection step is smaller than the error bit count in the starting scan, confirm that the inducement type is the charge leakage.

* * * * *